(12) United States Patent
Son et al.

(10) Patent No.: US 11,738,622 B2
(45) Date of Patent: Aug. 29, 2023

(54) HVAC APPARATUS FOR A VEHICLE

(71) Applicants: HYUNDAI MOTOR COMPANY, Seoul (KR); KIA CORPORATION, Seoul (KR); HANON SYSTEMS, Daejeon (KR)

(72) Inventors: Jeong Woong Son, Seoul (KR); Seok Jun Oh, Gwacheon-si (KR); Dong Won Yeon, Daejeon (KR); In Keun Kang, Daejeon (KR)

(73) Assignees: HYUNDAI MOTOR COMPANY, Seoul (KR); KIA CORPORATION, Seoul (KR); HANON SYSTEMS, Daejeon (KR)

( * ) Notice: Subject to any disclaimer, the term of this patent is extended or adjusted under 35 U.S.C. 154(b) by 155 days.

(21) Appl. No.: 17/531,550

(22) Filed: Nov. 19, 2021

(65) Prior Publication Data
US 2022/0288996 A1    Sep. 15, 2022

(30) Foreign Application Priority Data

Mar. 12, 2021   (KR) .......................... 10-2021-0032375

(51) Int. Cl.
*B60H 1/00*   (2006.01)

(52) U.S. Cl.
CPC ..... *B60H 1/00692* (2013.01); *B60H 1/00271* (2013.01); *B60H 2001/00714* (2013.01)

(58) Field of Classification Search
CPC ............ B60H 1/00692; B60H 1/00271; B60H 1/00671; B60H 1/00842; B60H 2001/00714; B60H 2001/00178
See application file for complete search history.

(56) References Cited

U.S. PATENT DOCUMENTS

| | | | |
|---|---|---|---|
| 2002/0025772 A1* | 2/2002 | Egami ................ | B60H 1/00849 454/126 |
| 2007/0238406 A1* | 10/2007 | Jeong ................. | B60H 1/00849 454/145 |

(Continued)

FOREIGN PATENT DOCUMENTS

| | | |
|---|---|---|
| JP | 2001315525 A | 11/2001 |
| KR | 980001069 A | 3/1998 |

(Continued)

*Primary Examiner* — Marc E Norman
(74) *Attorney, Agent, or Firm* — LEMPIA SUMMERFIELD KATZ LLC

(57) ABSTRACT

A heating, ventilating, and air conditioning (HVAC) apparatus for a vehicle includes: a case, which is configured to communicate with the outside of the vehicle and which includes a discharge flow path connected to an interior of the vehicle; an outside air inlet, which is located in the case and into which air is introduced from the outside of the vehicle; an inside air inlet configured to communicate with the interior of the vehicle; a filter unit located adjacent to the discharge flow path; an inside/outside air switching door provided adjacent to the outside air inlet and the inside air inlet and configured to selectively open the outside air inlet and the inside air inlet; and an auxiliary switching door, which includes a depression located at a lower end of the filter unit and which is selectively opened so as to allow the depression and an outdoor outlet to be fluidly connected.

6 Claims, 4 Drawing Sheets

(56) References Cited

U.S. PATENT DOCUMENTS

2013/0155396 A1    6/2013    Deliwala
2019/0184944 A1*  6/2019    Kim .......................... A47L 5/38
2021/0146752 A1*  5/2021    Lee .................... B60H 1/00849

FOREIGN PATENT DOCUMENTS

KR       200345265 Y1    3/2004
KR     20170035481 A    3/2017

* cited by examiner

HVAC APPARATUS FOR A VEHICLE

CROSS-REFERENCE TO RELATED APPLICATION

This application claims under 35 U.S.C. § 119(a) the benefit of priority to Korean Patent Application No. 10-2021-0032375 filed on Mar. 12, 2021, the entire contents of which are incorporated herein by reference.

BACKGROUND

(a) Technical Field

The present disclosure relates to a heating, ventilating, and air conditioning (HVAC) apparatus for a vehicle, and more particularly, to a HVAC apparatus for a vehicle capable of selectively discharging foreign materials accumulated in the HVAC apparatus into which outdoor air is introduced.

(b) Background Art

Generally, a HVAC apparatus for a vehicle includes a cooling system for cooling an interior of the vehicle and an air conditioning or heating device for heating the interior of the vehicle.

The cooling system is configured to perform heat exchange between air, which flows from an evaporator of a refrigerant cycle to the outside of the evaporator, and a refrigerant flowing in the evaporator to convert the air into cold air, thereby cooling an interior of the vehicle. The air conditioning device is configured to perform heat exchange between air, which flows from a heater core of a cooling water cycle to the outside the heater core, and cooling water flowing in the heater core to convert the air into warm air, thereby heating the interior of the vehicle.

In addition, as a configuration different from the above-described HVAC apparatus for a vehicle, a heat pump system capable of selectively performing cooling and heating by switching a flow direction of a refrigerant using one refrigerant cycle has been applied. For example, the heat pump system includes two heat exchangers (i.e., an indoor heat exchanger installed in an air conditioning case to exchange heat with air blown into the interior of the vehicle, and an outdoor heat exchanger to perform heat exchange outside the air conditioning case), and at least one directional control valve capable of switching a flow direction of the refrigerant.

Thus, when a cooling mode is executed according to the flow direction of the refrigerant by the directional control valve, the indoor heat exchanger serves as a cooling heat exchanger. When a heating mode is executed, the indoor heat exchanger serves as a heating heat exchanger.

In addition, recently, efforts to reduce a layout of a HVAC apparatus located in a vehicle are carried out such that a motor for driving a directional control valve or a switching door is located in a horizontal structure. Also, a filter unit in contact with outside air is configured in a vertical direction.

However, when the above structure is included, there is a problem in that foreign materials filtered from the filter unit are stacked in a lower portion of the filter unit. In addition, in the case of the HVAC apparatus including a closed case, separate man-hours for discharging the foreign materials filtered by the filter unit are required.

SUMMARY

The present disclosure has been made in an effort to solve the above-described problems associated with prior art.

In one aspect, the present disclosure provides a heating, ventilating, and air conditioning (HVAC) apparatus for a vehicle capable of discharging foreign materials stacked in a lower portion of a filter unit.

In another aspect, the present disclosure provides a controller for controlling an auxiliary switching door so as to perform a discharge of foreign materials by interlocking with a state of the vehicle.

Objectives of the present disclosure are not limited to the above-described objectives. Other objectives of the present disclosure, which are not mentioned, can be understood by the following description and also should be apparent and understood through embodiments of the present disclosure. Further, the objectives of the present disclosure can be implemented by means described in the appended claims and a combination thereof.

An HVAC apparatus for a vehicle for achieving the objectives of the present disclosure includes the following configuration.

In an embodiment, the present disclosure provides a HVAC apparatus for a vehicle. The HVAC apparatus includes: a case, which is configured to communicate with the outside of the vehicle and which includes a discharge flow path connected to an interior of the vehicle; an outside air inlet, which is located in the case and into which air is introduced from the outside of the vehicle; an inside air inlet configured to communicate with the interior of the vehicle; a filter unit located adjacent to the discharge flow path; an inside/outside air switching door provided adjacent to the outside air inlet and the inside air inlet and configured to selectively open the outside air inlet and the inside air inlet; and an auxiliary switching door, which includes a depression located at a lower end of the filter unit and which is selectively opened so as to allow the depression and an outdoor outlet to be fluidly connected.

In addition, the HVAC apparatus may further include an auxiliary motor configured to open the auxiliary switching door, a main motor configured to rotate the inside/outside air switching door, and a controller configured to control a rotation amount of each of the auxiliary motor and the main motor.

In addition, in at least one state among a parking state of the vehicle, a starting-off state thereof, and a filter replacement state thereof, the controller may be configured to rotate the auxiliary motor to open the auxiliary switching door.

In addition, the controller may be configured to control the rotation amount of the main motor in response to an inside/outside air switching input of a user.

In addition, the HVAC apparatus may further include a blower located adjacent to the filter unit and a temperature control device located along the discharge flow path.

In addition, a region of the case including the auxiliary switching door may be formed to protrude downward when compared to a height of the case in which the depression is located.

Other aspects and embodiments of the present disclosure are discussed below.

It should be understood that the terms "vehicle" or "vehicular" or other similar terms as used herein are inclusive of motor vehicles in general. Such motor vehicles may include passenger automobiles including sports utility vehicles (SUV), buses, trucks, various commercial vehicles, watercraft including a variety of boats and ships, aircraft, and the like. Such motor vehicles also include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example vehicles that are both gasoline-powered and electric-powered.

The above and other features of the present disclosure are discussed below.

BRIEF DESCRIPTION OF THE DRAWINGS

The above and other features of the present disclosure are now described in detail with reference to certain embodiments thereof illustrated in the accompanying drawings, which are given hereinbelow by way of illustration only, and thus are not limitative of the present disclosure, and wherein.

Figure 1:
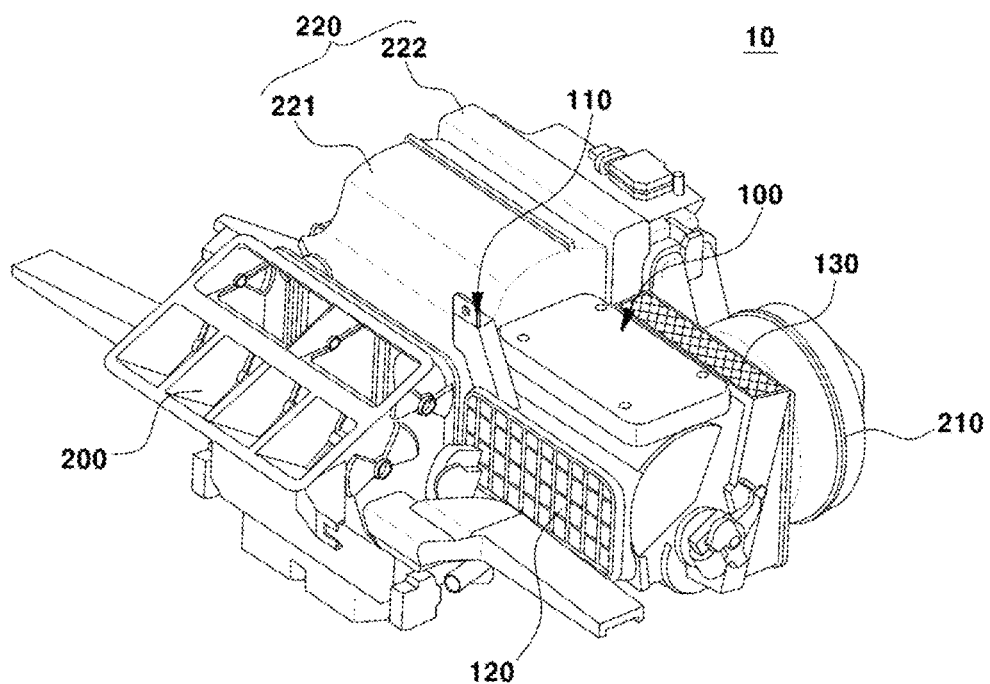
FIG. 1 is a perspective view illustrating a heating, ventilating, and air conditioning (HVAC) apparatus for a vehicle according to one embodiment of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

DETAILED DESCRIPTION

Hereinafter, embodiments of the present disclosure are described in detail with reference to the accompanying drawings. The embodiments of the present disclosure can be modified in various forms, and the scope of the present disclosure should not be construed as being limited to the following embodiments. These embodiments are provided to more fully describe the present disclosure to those having ordinary skill in the art.

In addition, the terms "~part," "~unit," "~module," or the like disclosed herein mean a unit for processing at least one function or operation. Such units may be implemented by hardware, software, or a combination of hardware and software.

Further, in the present specification, the terms "main," "auxiliary," and the like are assigned to components so as to discriminate these components because names of the components are the same. However, these terms are not necessarily limited to the order in the following description.

In addition, in the present specification, an "opened" state includes all of a partially opened state or a totally opened state as states of a switching door and includes a state in which front and rear ends of the switching door are fluidly connected. A "blocked" or "closed" state refers to a state in which a fluid flow at the front and rear ends of the switching door is blocked.

Hereinafter, embodiments are described in detail with reference to the accompanying drawings. In describing the embodiments with reference to the accompanying drawings, the same or corresponding components are assigned the same reference numerals, and duplicate descriptions thereof have been omitted therein.

The present disclosure relates to a heating, ventilating, and air conditioning (HVAC) apparatus 10 of a vehicle. More specifically, the HVAC apparatus 10 includes an outside air inlet 110 into which outdoor air is introduced and includes an inside air inlet 120 configured to circulate indoor air. The HVAC apparatus 10 is configured such that the introduced air passes through a filter unit 130 in a case 100 to be purified.

FIG. 1 is a perspective view illustrating the HVAC apparatus 10 for a vehicle according to one embodiment of the present disclosure.

As shown in the drawing, the HVAC apparatus 10 according to the present disclosure includes the outside air inlet 110, the inside air inlet 120, and a discharge flow path 200. The outside air inlet 110 is configured to be fluidly connected to outside air along an upper end of the case 100 and the inside air inlet 120 is configured to be fluidly connected to an interior of the vehicle along an intermediate end of the case 100.

Air introduced into the case 100 is circulated along the discharge flow path 200 adjacent to the filter unit 130. Thus, the discharge flow path 200 may be included at an end of the case 100 at which the outside air inlet 110 and the inside air inlet 120 are located. The filter unit 130 is configured to cover an entirety of the discharge flow path 200 and thus the filter unit 130 may be configured to have a predetermined angle in a height direction. The air passing through the filter unit 130 is discharged to an interior duct of the vehicle via an evaporator 222 or/and a heater 221 through the blower 210.

The filter unit 130 is located so as to have a predetermined angle based on the height direction of the case 100. Thus, a lower end of the filter unit 130 is engaged with an inner side of the case 100 at a position close to the case 100 in which the outside air inlet 110 and the inside air inlet 120 are located.

The filter unit 130 is configured to be detached from the case 100 and thus the filter unit 130 may be replaced by opening a cover located on an upper surface of the case 100.

The case 100 of the discharge flow path 200 adjacent to the blower 210 includes a temperature control device 220 and is configured to vary a temperature of the air discharged to the interior duct. In one embodiment, the temperature control device 220 may include one or more of the heater 221 or the evaporator 222, thereby varying a temperature of the discharged air, which is discharged to the interior duct.

An inside/outside air switching door 300, which is rotated relative to at least one end of the case 100, is included at a position of the case 100 at which the outside air inlet 110 is adjacent to the inside air inlet 120. A main motor 310 is further included, which is engaged with one end of the inside/outside air switching door 300 and fixed to the case 100. The inside/outside air switching door 300 is configured to selectively block the outside air inlet 110 and the inside air inlet 120 and thus is configured to open at least a part of the outside air inlet 110 or the inside air inlet 120 according to a rotation amount of the main motor 310. As described above, the rotation amount of the main motor 310 may be determined in response to a selection of an inflow amount of inside/outside air by a user.

In one embodiment, a controller (not shown) may be configured to control electric power of a battery, which is applied to the main motor 310. The electric power applied to the main motor 310 is thereby controlled so as to rotate the inside/outside air switching door 300 between an opening of the outside air inlet 110 and an opening of the inside air inlet 120 and controlling air amounts of the inside air and the outside air introduced into the case 100.

The filter unit 130 located adjacent to the discharge flow path 200 on the inner side of the case 100 is configured to purify the air introduced into the outside air inlet 110 or the inside air inlet 120 and to allow the purified air to communicate with the blower 210 along the discharge flow path 200.

Foreign materials purified by the filter unit 130 are collected in a depression 150 on a lower surface of the case 100 due to gravity or along an angle at which the filter unit 130 is formed in a height direction. In one embodiment, one end of the filter unit 130 is located at the highest point of the depression 150 and the depression 150 is formed to be inclined toward the outdoor outlet 140 from the one end of the filter unit 130.

A rear surface of the case 100, on which the depression 150 is located, may be formed to be inclined toward one end adjacent to an auxiliary switching door 400. A region of the case 100, in which the auxiliary switching door 400 adjacent to the depression 150 is pivoted, may be formed to protrude further downward than the depression 150 facing the auxiliary switching door 400. In one embodiment, a shape of the rear surface of the case 100 including the auxiliary switching door 400 may be formed to protrude further downward than the rear surface of the case 100 including the depression 150.

Thus, the foreign materials collected by the filter unit 130 are collected in the depression 150 due to their own weight and moved to a position adjacent to the auxiliary switching door 400 along the inclined surface of the depression 150. Accordingly, the foreign materials located on an inner side of the depression 150 are discharged to the outside of the case 100 through the outdoor outlet 140 in a state in which the auxiliary switching door 400 is opened. In addition, the case 100 including the auxiliary switching door 400 is formed to protrude further downward than the region of the case 100 in which the depression 150 is located. Thus, the foreign materials collected in the depression 150 are easily discharged to the outside of case 100 when the auxiliary switching door 400 is opened.

Figure 2:
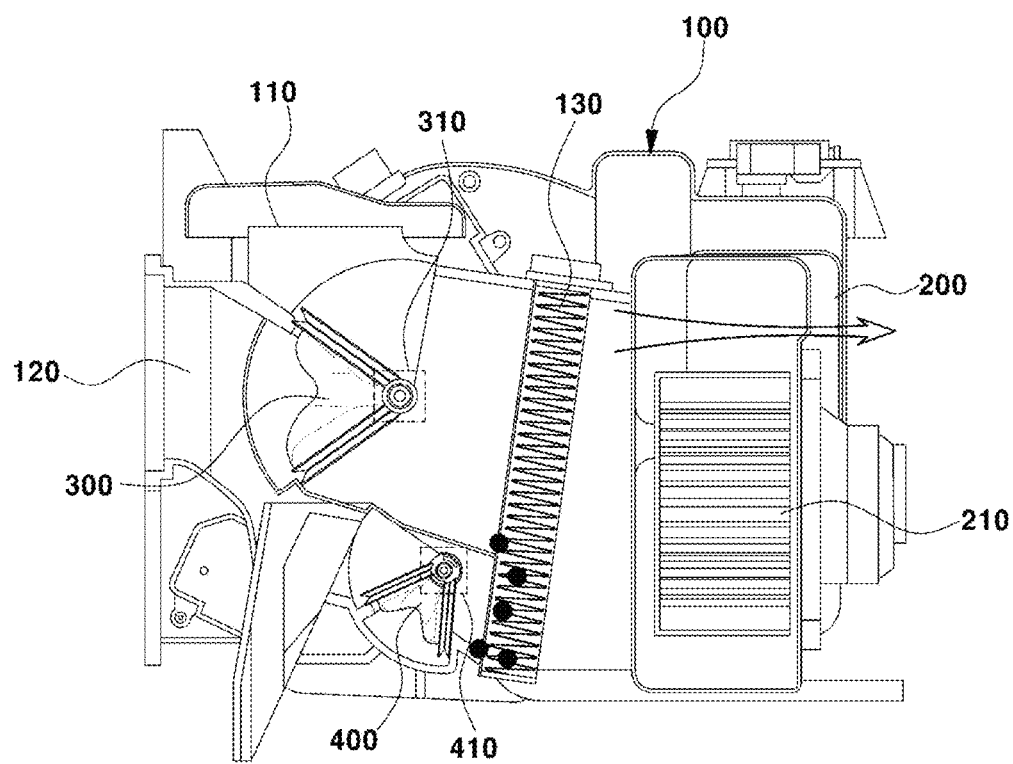
FIG. 2 is a side cross-sectional view illustrating the HVAC apparatus for a vehicle according to one embodiment of the present disclosure.

FIG. 2 is a side cross-sectional view illustrating the case 100 adjacent to the outside air inlet 110 and the inside air inlet 120 of the HVAC apparatus 10.

As shown in the drawing, the outside air inlet 110 is configured to be fluidly connected to the outside air on one surface of the upper end of the case 100. The inside air inlet 120 is configured to be fluidly connected to the interior of the vehicle on a side surface of the case 100 adjacent to the outside air inlet 110.

The inside/outside air switching door 300 is located between the inside air inlet 120 and the outside air inlet 110, which are adjacent to each other. The inside/outside air switching door 300 is configured to selectively open and close the inside air inlet 120 and the outside air inlet 110 in response to a rotation amount of a motor engaged with the inside/outside air switching door 300 at an outer side of the case 100.

The inside/outside air switching door 300 may selectively completely close or open the outside air inlet 110 and the inside air inlet 120. In one embodiment, the inside/outside air switching door 300 may be configured to close at least parts of the outside air inlet 110 and the inside air inlet 120, thereby controlling a degree of opening of the outside air inlet 110 or the inside air inlet 120 in response to a user's request.

The filter unit 130 may be located to cross the upper and lower ends of the case 100 and may include a cover located above the case 100 so as to allow the filter unit 130 to be detachable from the case 100. The filter unit 130 may be located at the front end or the rear end of the blower 210. In one embodiment of the present disclosure, the filter unit 130 may be located at the front end of the blower 210 to be located adjacent to the inside air inlet 120 and the outside air inlet 110.

According to one embodiment of the present disclosure, the filter unit 130 is configured to be inclined at a predetermined angle based on the height direction of the case 100. Thus, the lower end of the case 100 is engaged to a closer position than the outer surface of the case 100. In one embodiment, the auxiliary switching door 400 is included in a region adjacent to the lower end of the filter unit 130.

The filter unit 130 is inclined to be far away from the inside air inlet 120 and the outside air inlet 110 in the height direction based on the position adjacent to the lower end of the case 100. Thus, the foreign materials collected on an upper end of the filter unit 130 slide naturally to the lower end of the filter unit 130.

Thus, the inside air or the outside air, which is introduced into the case 100, moves along the filter unit 130 and the foreign materials included in the inside air or the outside air are purified through the filter unit 130. In addition, the foreign materials purified by the inclined filter unit 130 are collected on the lower end of the case 100 due to their own weight.

The collected foreign materials of the filter unit 130 are introduced into the depression 150 located at the lower end of the case 100. When the auxiliary switching door 400, which is located at a distal end of the depression 150 and is opened due to a driving force of the auxiliary motor 410 located in the case 100, is opened, the collected foreign materials are discharged to the outside of the case 100.

The controller is configured to open the auxiliary switching door 400 in conditions such as a parking state, a starting off state, or a filter replacement state of the vehicle. Thus, the foreign materials collected in the depression 150 are discharged to the outside of the case 100. In one embodiment, the controller is configured to open the auxiliary switching door 400 by driving the auxiliary motor 410 in the above conditions. The case 100 in which the auxiliary switching door 400 is located may be configured to protrude further downward than the case 100 in which the depression 150 is located. The case 100 may also have a shape in which the distal end of the depression 150 is in contact with one surface of the auxiliary switching door 400 in a state in which the auxiliary switching door 400 is closed.

Figure 3A:
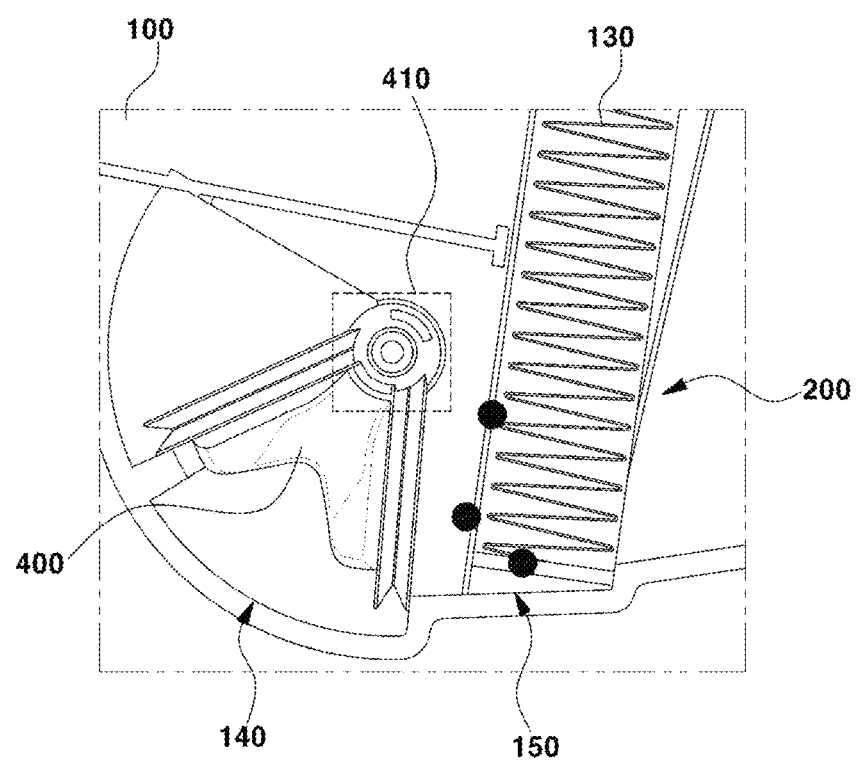
FIG. 3A is a diagram illustrating a closed state of an auxiliary switching door of the HVAC apparatus according to one embodiment of the present disclosure.
Figure 3B:
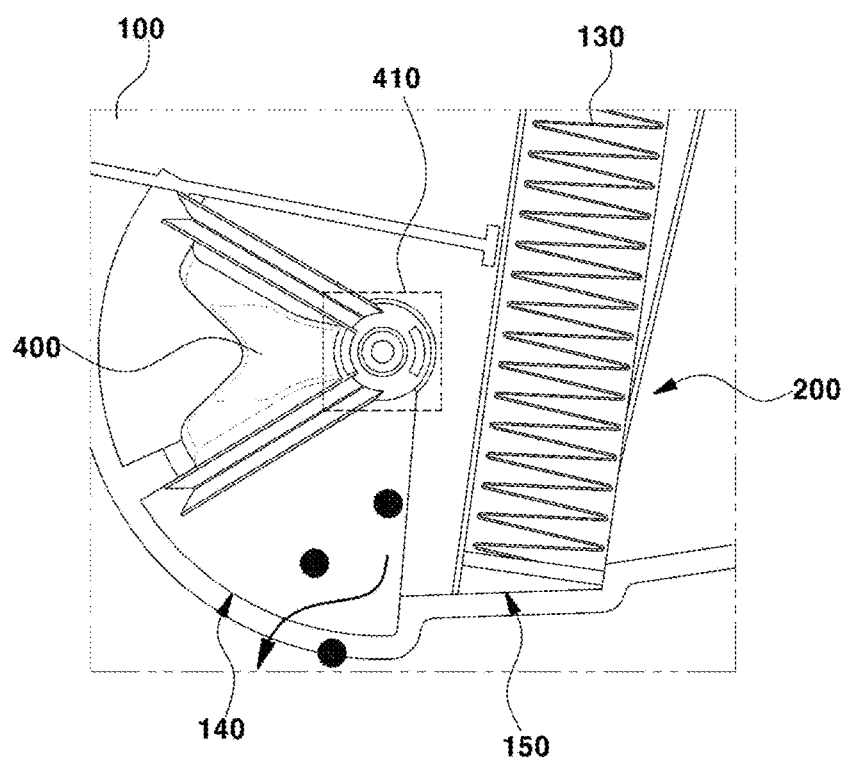
FIG. 3B is a diagram illustrating an opened state of the auxiliary switching door of the HVAC apparatus according to one embodiment of the present disclosure.

FIG. 3A is an enlarged view illustrating the lower end of the case 100 in a state in which an auxiliary door is closed. FIG. 3B is an enlarged view illustrating the lower end of the case 100 in a state in which the auxiliary door is opened.

The lower end of the inclined filter unit 130 is located to be adjacent to the rear surface of the case 100. A fixing part configured to fix the lower end of the filter unit 130, which is inserted into the fixing part, is included on the rear surface of the case 100.

As shown in FIG. 3A, a height of the depression 150 extends from the outdoor outlet 140 along the lower end of the filter unit 130 to be increased, and the lowest end of the depression 150 adjacent to the outdoor outlet 140 is configured to be selectively sealed by the auxiliary switching door 400. Thus, in a state in which the auxiliary switching door 400 is closed, the outdoor outlet 140 is in a completely closed state so that a state in which the foreign materials are collected in the depression 150 is maintained. In one embodiment, when compared to the rear surface of the case 100 including the depression 150, the lower end of the case 100 including the auxiliary switching door 400 protrudes downward and one end of the depression 150 is in contact with an inner surface of the auxiliary switching door 400 in a state in which the auxiliary switching door 400 is closed.

In other words, an open surface of the outdoor outlet 140 may be continuously connected from a distal end of a lower surface of the depression 150 facing the outdoor outlet 140. Also, the auxiliary switching door 400 located to cover a side surface of the outdoor outlet 140 may be located to seal the distal end of the depression 150.

The depression 150 is formed to be inclined from the lower end of the filter unit 130 to a region in which the auxiliary switching door 400 is located. The distal end of the depression 150 is maintained to be in contact with the auxiliary switching door 400 in a state in which the auxiliary switching door 400 is closed.

Thereafter, as disclosed in FIG. 3B, when the auxiliary switching door 400 is opened due to driving of the auxiliary motor 410 by the controller, the foreign materials filtered by the filter unit 130 and collected in the depression 150 are discharged to the outside of the case 100 through the outdoor outlet 140.

In addition, since the distal end of the lower surface of the depression 150 is formed at a position that is higher than an opened end of the outdoor outlet 140, the foreign materials collected in the depression 150 may be discharged to the outside of the case 100 when the auxiliary switching door 400 is opened.

According to one embodiment of the present disclosure, in order to perform a starting-off of the vehicle and a replacing of the filter unit 130, the controller may open the auxiliary switching door 400 in a condition in which the upper end of the case 100 is opened.

The case 100 in which the depression 150 is located is formed to be inclined downward toward the region adjacent to the auxiliary switching door 400. The region of the case 100 including the auxiliary switching door 400 is formed to protrude downward when compared to the height of the case 100 including the depression 150. Therefore, when the auxiliary switching door 400 is opened, the distal end of the depression 150 is switched to a completely opened state so that the foreign materials may be discharged to the outside of the case 100.

The present disclosure can obtain the following effects according to a combination of the above-described embodiments and a configuration, which is described herein, and a use relationship.

In accordance with the present disclosure, purified foreign materials in a case can be discharged so that there is an effect capable of improving performance of a filter unit.

In addition, in accordance with the present disclosure, there is an effect of providing an open structure in which the foreign materials can be discharged without an additional configuration.

The foregoing detailed description illustrates the inventive concept of the present disclosure. Further, the foregoing is intended to illustrate and describe the embodiments of the present disclosure, although the present disclosure may be used in various other combinations, modifications, and environments. In other words, it is possible to practice alterations or modifications without departing from the scope of the present inventive concept disclosed in this specification, equivalents, and/or within the technical or scope of knowledge in the art to which the present disclosure pertains. The described embodiments are intended to illustrate the best mode for carrying out the technical spirit of the present disclosure and various modifications can made in the specific applications and uses of the present disclosure. Therefore, the detailed description is not intended to limit the present disclosure as in the disclosed embodiments. Further, it should be construed that the appended claims are intended to include other embodiments.

What is claimed is:

1. A heating, ventilating, and air conditioning (HVAC) apparatus for a vehicle, the HVAC apparatus comprising:
a case including a discharge flow path, which communicates with a duct;
an outside air inlet, which is located in the case and into which air is introduced from the outside of the vehicle;
an inside air inlet configured to communicate with an interior of the vehicle;
a filter unit located to be inclined in the case;
an inside/outside air switching door provided adjacent to the outside air inlet and the inside air inlet and configured to selectively open the outside air inlet and the inside air inlet; and
an auxiliary switching door including a depression located at a lower end of the filter unit and configured to selectively open an outdoor outlet, which is adjacent to the depression and is opened to the outside of the case.

2. The HVAC apparatus of claim 1, further comprising:
an auxiliary motor configured to open the auxiliary switching door;
a main motor configured to rotate the inside/outside air switching door; and
a controller configured to control a rotation amount of each of the auxiliary motor and the main motor.

3. The HVAC apparatus of claim 2, wherein, in at least one state among a parking state of the vehicle, a starting-off state thereof, and a filter replacement state thereof, the controller is configured to rotate the auxiliary motor to open the auxiliary switching door.

4. The HVAC apparatus of claim 2, wherein the controller is configured to control the rotation amount of the main motor in response to an inside/outside air switching input by a user.

5. The HVAC apparatus of claim 1, further comprising:
a blower located adjacent to the filter unit; and
a temperature control device located along the discharge flow path.

6. The HVAC apparatus of claim 1, wherein a region of the case including the auxiliary switching door is formed to protrude downward when compared to a height of the case in which the depression is located.

* * * * *